(12) United States Patent
Abe et al.

(10) Patent No.: US 11,150,549 B2
(45) Date of Patent: Oct. 19, 2021

(54) MAGNET SCREEN DEVICE

(71) Applicant: IZUMI-COSMO COMPANY, LIMITED, Osaka (JP)

(72) Inventors: Teruyuki Abe, Tokyo (JP); Shuhei Kameda, Tokyo (JP); Kazuharu Seki, Tokyo (JP)

(73) Assignee: IZUMI-COSMO COMPANY, LIMITED, Osaka (JP)

( * ) Notice: Subject to any disclaimer, the term of this patent is extended or adjusted under 35 U.S.C. 154(b) by 343 days.

(21) Appl. No.: 16/331,439

(22) PCT Filed: Feb. 27, 2017

(86) PCT No.: PCT/JP2017/007365
§ 371 (c)(1),
(2) Date: Mar. 7, 2019

(87) PCT Pub. No.: WO2018/047373
PCT Pub. Date: Mar. 15, 2018

(65) Prior Publication Data
US 2019/0219916 A1    Jul. 18, 2019

(30) Foreign Application Priority Data

Sep. 9, 2016    (JP) .............................. JP2016-177003

(51) Int. Cl.
*G03B 21/58*    (2014.01)
*B43L 1/00*     (2006.01)
*B43L 1/04*     (2006.01)

(52) U.S. Cl.
CPC .............. *G03B 21/58* (2013.01); *B43L 1/008* (2013.01); *B43L 1/045* (2013.01)

(58) Field of Classification Search
CPC .......... G03B 21/58; B43L 1/008; B43L 1/045
See application file for complete search history.

(56) References Cited

U.S. PATENT DOCUMENTS 10,442,647 B2 *  10/2019  Seki ....................... B65H 18/08
2016/0266481 A1 *  9/2016  Abe ....................... G03B 21/58

FOREIGN PATENT DOCUMENTS

JP            3195909          1/2015
JP         2015045715 A        3/2015
(Continued)

OTHER PUBLICATIONS

International Search Report for related International Application No. PCT/JP2017/007365 dated Mar. 24, 2017.
(Continued)

*Primary Examiner* — Christopher E Mahoney
(74) *Attorney, Agent, or Firm* — Renner, Otto, Boisselle & Sklar, LLP

(57) ABSTRACT

According to an embodiment of the present invention, there is provided a magnet screen device, comprising a casing having an opening, a roll rotatably placed in the casing, and a magnet screen, the magnet screen being configured to be wound on the roll during a storage of the magnet screen and configured to be pulled out from the opening of the casing and to be attached to an installation surface upon an use of the magnet screen, wherein the magnet screen device further comprises a bar part at a region where the opening is provided, and wherein the bar part is configured to be capable of contacting the magnet screen at the region where the opening is provided.

14 Claims, 5 Drawing Sheets

(56) References Cited

FOREIGN PATENT DOCUMENTS

| JP | 2015163923 A | 9/2015 |
|---|---|---|
| JP | 2015217642 A | 12/2015 |
| JP | 2016038475 A | 3/2016 |
| JP | 2016167025 A | 9/2016 |

OTHER PUBLICATIONS

Office Action for Japanese Application No. 2018-528078 dated Jul. 3, 2018.
Office Action for Japanese Application No. 2018-528078 dated Aug. 21, 2018.
International Preliminary Report on Patentability for related International Application No. PCT/JP2017/007365 dated Mar. 12, 2019 and English Translation.

* cited by examiner

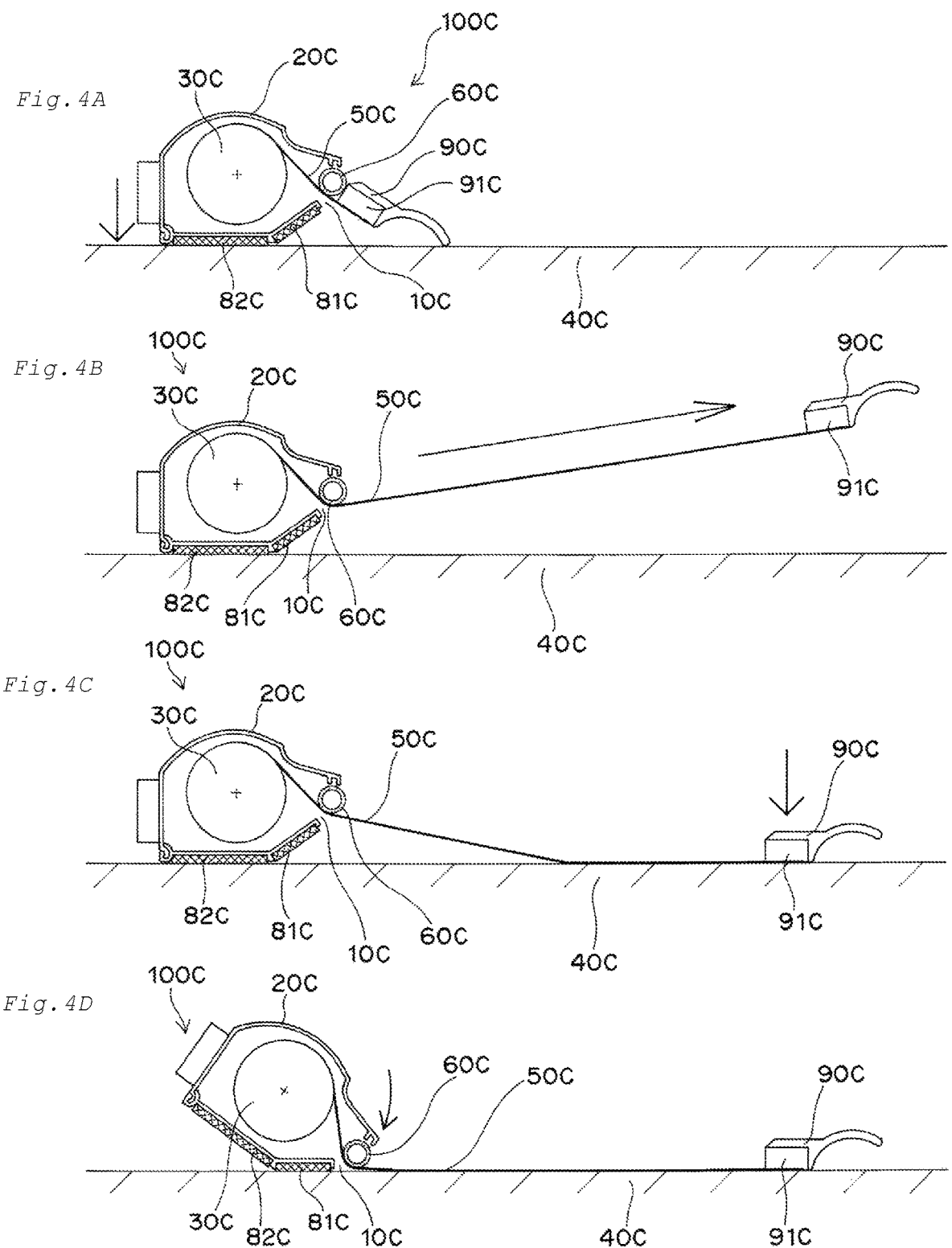

MAGNET SCREEN DEVICE

TECHNICAL FIELD

The disclosure relates to a magnet screen device.

BACKGROUND OF THE INVENTION

A magnet screen device is conventionally used as blackboard and the like such as a blackboard and a whiteboard in school facility and the like. Specifically, a following embodiment, in which a magnet screen is attached to the blackboard and the like and a projection of an image is performed from a projector on the magnet screen to give a class, is often adopted.

In this regard, Patent Document 1 discloses that a support part for rotatably supporting a roll is held and thus a roll is moved while being rotated onto blackboard and the like, thereby to extend or wind a magnet screen.

PATENT DOCUMENTS (RELATED ART PATENT DOCUMENTS)

PATENT DOCUMENT 1: Japanese Unexamined Patent Application Publication No. 2016-38475

DISCLOSURE OF THE INVENTION

Problems to be Solved by the Invention

However, the inventors of the present application have found that a conventional magnet screen device has the following improvements. Specifically, when the magnet screen as a component of the device is attached to an installation surface of blackboard and the like, a local area of the magnet screen may be spaced apart from the installation surface. Although not bound by any particular theory, it is conceived that an occurrence of a gap between the magnet screen and the installation surface is due to an intrusion of air between the magnet screen and the installation surface. The gap may make a suitable projection of an image from a projector difficult.

Under these circumstances, the present invention has been created. That is, an object of the present invention is to provide a magnet screen device capable of suitably attaching a magnet screen to an installation surface.

Means for Solving the Problems

In order to achieve the above object, an embodiment of the present invention provides a magnet screen device, comprising
a casing having an opening, a roll rotatably placed in the casing, and a magnet screen, the magnet screen being configured to be wound on the roll during a storage of the magnet screen and configured to be pulled out from the opening of the casing and to be attached to an installation surface upon an use of the magnet screen,
wherein the magnet screen device further comprises a bar part at a region where the opening is provided, and
wherein the bar part is configured to be capable of contacting the magnet screen at the region where the opening is provided.

In a preferable embodiment, the magnet screen at the opening is positioned between the bar part and the installation surface in a cross-sectional view.

In a preferable embodiment, the bar part is configured to be rotatable due to a sliding contact of the bar part with the magnet screen.

In a preferable embodiment, the casing comprises a first magnet on a surface of the casing and a second magnet extending to a direction different from an extension direction of the first magnet in a cross-sectional view, and
wherein the bar part is positioned to be substantially flush with the first magnet in a cross-sectional view.

In a preferable embodiment, the magnet screen device comprises an end bar having a magnet surface, the end bar being positioned at other of end portions which is opposite to one of end portions contacted with the roll, and
wherein the casing is configured to be capable of moving in a direction along the installation surface in a state that the first magnet and the second magnet are spaced apart from the installation surface and the magnet surface of the end bar is attached to the installation surface.

In a preferable embodiment, the bar part is configured to be capable of pressing the magnet screen at the opening to the installation surface in a cross-sectional view during a movement in a direction of the casing.

In a preferable embodiment, the bar part is configured such that a self-weight of the bar part is continuously applied to the magnet screen to be pulled out on the installation surface during a movement in a direction of the casing.

In a preferable embodiment, the magnet screen at the opening continuously maintains a state of a contact with both of the bar part and the installation surface in a cross-sectional view during a movement in a direction of the casing.

In a preferable embodiment, the casing comprises a first magnet on a surface of the casing and a second magnet extending to a direction different from an extension direction of the first magnet in a cross-sectional view, and
wherein the bar part is positioned to be substantially flush with the first magnet in a cross-sectional view.

In a preferable embodiment, the magnet screen device comprises an end bar having a magnet surface, the end bar being positioned at other of end portions which is opposite to one of end portions contacted with the roll, and
wherein the casing is configured to be capable of moving in a direction along the installation surface in a state that the first magnet and the second magnet are spaced apart from the installation surface and the magnet surface of the end bar is attached to the installation surface.

In a preferable embodiment, the bar part is configured such that a self-weight of the bar part is continuously applied the magnet screen at a pull out portion from the opening during a movement in a direction of the casing.

In a preferable embodiment, a rotational movement in a clockwise direction or a counterclockwise direction of the casing moved in a direction enables the first magnet to be attached to the installation surface in a cross-sectional view.

In a preferable embodiment, the magnet screen is configured to be capable of being pulled out in a direction in a state that the second magnet is attached to the installation surface, and
wherein a rotational movement in a clockwise direction or a counterclockwise direction of the casing enables the bar part which is substantially flush with the first magnet to be moved to a side of the installation surface in a cross-sectional view, the rotational movement in the clockwise direction or the counterclockwise direction of the casing being configured such that the first magnet is attached to the installation surface in a cross-sectional view.

In a preferable embodiment, the bar part is configured such that a self-weight of the bar part is applied to the magnet screen at a pull out portion from the opening upon the rotational movement of the casing.

In a preferable embodiment, the bar part is configured to be capable of protruding at the region where the opening is provided.

In a preferable embodiment, the bar part comprises a press part on at least a portion of a surface of the bar part, and wherein the press part is configured to be capable of contacting the magnet screen.

Effect of the Invention

In a magnet screen device according to an embodiment of the present invention, it is possible to suitably attach a magnet screen to an installation surface. Therefore, a suitable projection of an image from a projector is possible.

BRIEF DESCRIPTION OF THE DRAWINGS

FIGS. 4A-4D are cross-sectional views schematically showing another embodiment on a use of a magnet screen device.

MODES FOR CARRYING OUT THE INVENTION

Hereinafter, a magnet screen device according to an embodiment of the present invention will be described with reference to drawings.

Figure 1:
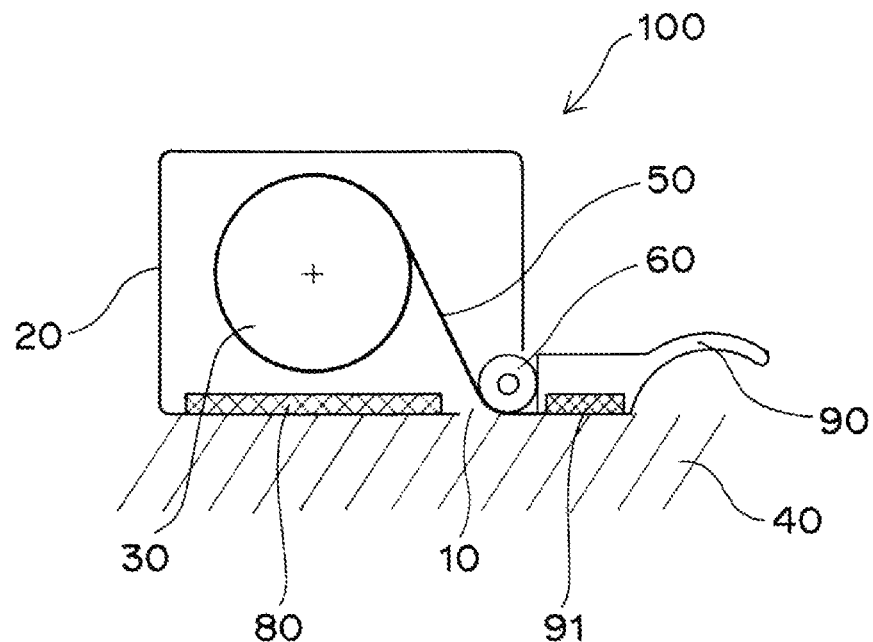
FIG. 1 is a cross-sectional view schematically showing a magnet screen device according to an embodiment of the present invention.

FIG. 1 is a cross-sectional view schematically showing a magnet screen device according to an embodiment of the present invention.

(Basic Configuration of Magnet Screen Device)

As shown in FIG. 1, a magnet screen device 100 according to an embodiment of the present invention includes a casing 20 having an opening 10, a roll 30 rotatably placed in the casing 20, and a magnet screen 50, the magnet screen 50 being configured to be wound on the roll 30 during a storage of the magnet screen and also configured to be pulled out from the opening 10 of the casing 20 and to be attached to an installation surface 40 upon an use of the magnet screen.

The magnet screen 50 is a screen sheet for projecting an image from a projector. The magnet screen has a flexibility due to a "sheet", especially has a flexibility with an extent that the magnet screen can be wound. A shape of the magnet screen 50 is a rectangular shape, especially a belt shape as a whole. During a non-use, the screen sheet is held in a wound state.

More specifically, the magnet screen 50 has a projection surface and a magnet surface. That is, two main surfaces of the magnet screen 50, the two main surfaces being opposed to each other, are the projection surface and the magnet surface. The projection surface corresponds to a sheet surface for projecting the image from the projector, whereas the magnet surface corresponds to a sheet surface to be attached to the installation surface upon a use. In view of an use embodiment, the projection surface corresponds to a front surface and the magnet surface corresponds to a back surface.

The magnet screen 50 having the projection surface and the magnet surface may be composed of a resin layer and a magnet layer at least, for example. In this case, the resin layer on the front surface side serves as the projection surface, and the magnet layer on the back surface side serves as the magnet surface. The resin layer may be made of a resin material of a screen sheet which is commonly used. On the other hand, the magnet layer may be a layer having a magnetic force and may be a layer containing a resin material and/or a rubber material with a magnet powder or the like which is commonly used, for example.

In the magnet screen 50, one of end portions thereof is connected with the roll 30, while and end bar 90 is provided on other of the end portions on an opposite side of the one of the end portions. As shown in FIG. 1, a part pf the end bar 90 includes a magnetic surface 91 which can be attached to the installation surface 40.

The roll 30 corresponds to a part for holding the magnet screen 50 in a wound state during a non-use state of the magnet screen device 100. One of widthwise or transverse side end portions of the magnet screen 50 is secured to the roll 30, and the magnet screen 50 is wound around the roll 30 from the secured portion. An overall shape of the roll 30 is not particularly limited, but it may be a columnar shape extending longitudinally along a rotation axis, for example.

For example, the roll 30 includes a spring member which forces the magnetic screen 50 to rotate in a direction for winding the magnet screen 50. That is, the roll 30 may be a spring roll. In the spring roll, the magnet screen 50 is held in a wound state around the roll 30 due to a bias force of the spring member, and the magnet screen 50 is pulled out against the bias force of the spring member upon a use of the magnet screen. For example, the spring member of the spring roll may be a coil spring, preferably an elongated coil spring, the elongated coil spring being formed by spirally winding a small diameter spring steel wire a number of times.

Furthermore, a magnet 80 is provided on a surface of the casing 20. The casing 20 can be held on the installation surface 40 by attaching the magnet 80 to the installation surface 40.

(Features of Present Invention)

Features of the magnet screen device 100 according to an embodiment of the present invention will be described hereinafter with reference to FIG. 1.

The inventors of the present invention have intensively studied to solve the technical problem on the screen spaced apart from the installation surface as described above, and have created the present invention.

The term "casing" as used herein means a box-shaped housing part for rotatably supporting a roll around which a magnet screen is wound. The phrase "opening of the casing" as used herein means a gap provided on the casing surface along a longitudinal direction of the casing to pull out the magnet screen from an inside of the casing or to wind the magnet screen. The phrase "region where the opening of the casing is provided" as used herein means an opening itself of the casing and a region in a vicinity of the opening (i.e., a region inside or outside of the opening by 0 (excluding 0)

to about 10 mm in a cross-sectional view). The phrase "bar part" as used herein means an elongated part of metal for example extending in a direction along a longitudinal direction of the opening of the casing in a broad sense, and in a narrow sense, an elongated part of metal for example which is rotatably connected or supported to one of end portions and other of end portions of the region where the opening of the casing is provided and which extends in a direction along the longitudinal direction of the opening of the casing. The phrase "contact of the bar part with the magnet screen" as used herein means a state that the magnet screen directly touches the bar part upon a pull out or a winding of the magnet screen.

The phrase "installation surface" as used herein substantially means a blackboard, a white board or the like on which a magnet on a surface of the casing can be magnetically attached. The phrase "a direction-movement of the casing along the installation surface in a state that the magnetic surface of the end bar is attached to the installation surface" as used herein means a movement of the casing by an user for an indirect pull out of the magnet screen without an occurrence of the magnet screen which is continuously spaced apart from the installation surface. The phrase "a direction-pull out of the magnet screen in a state that a second magnet of the casing is attached to the installation surface" as used herein means a direct pull out of the magnet screen by an user without an occurrence of the magnet screen which is spaced apart from the installation surface discontinuously. The phrase "projection of the bar part" as used herein means a change of the bar part from a stationary state to a movement state that the bar part projects to be exposed at the opening, the stationary state corresponding to a state that the bar part is positioned in an inner region of the opening, the inner region being a region in the region where the opening is provided. The phrase "press part" means a part for applying a press force from the bar part to the magnet screen in a cross-sectional view to improve an adhesion between the magnet screen and the bar part.

Specifically, the inventors of the present invention have newly created that a bar part 60 is provided in a region where the opening 10 of the casing 20 is provided, the region being a starting point where the gap occurs as shown in FIG. 1. The bar part 60 corresponding to an elongated part is positioned at the opening 10 of the casing 20 for a pull out or a winding of the magnet screen 50. Specifically, the bar part 60 extends in a direction along a longitudinal direction of the opening 10, and has the substantially same longitudinal dimension as that of the opening 10. On the other hand, the bar part 60 has a widthwise or transverse dimension smaller than that of the opening 10. It is preferable that the widthwise or transverse dimension is a dimension which is capable of pulling out the magnet screen 50 from the opening 10 and which is capable of preventing the magnet screen 50 from being oriented in a direction opposite to the installation surface side direction. Thus, the bar part 60 can contact the magnet screen 50 at the region where the opening 10 is provided. In other words, the magnet screen 50 at the opening 10 can contact the bar part 60.

Thus, upon a pull out of the magnet screen 50 and a subsequent attachment of the magnet screen 50 on the installation surface such as the blackboard or the like, the bar part 60 can prevent a movement of the magnet screen 50 in a direction opposite to a direction of the installation surface side. Thus, it is possible to prevent an intrusion of air between the magnet screen 50 and the installation surface. Therefore, a so-called "gap" between the magnet screen 50 and the installation surface can be prevented. Namely, the bar part 60 functions as a "part for preventing the magnet screen from being spaced apart". As a result, the magnet screen 50 can be suitably attached to the installation surface. Accordingly, an image from a projector can be suitably projected.

Furthermore, in a comparison with a case that the bar part 60 is positioned at an outer region of the casing 20, the following effects are obtained in a case that the rod part 60 is positioned at the region where the opening 10 is provided. Specifically, a position of the opening 10 is a position where the magnet screen 50 is started to be pulled out in a direction opposite to a direction of the installation surface 40, that is, a position where "the magnet screen 50 is started to be spaced apart from the installation surface 40 upon the pull out of the magnet screen". In the present invention, the bar part 60 is provided at such the position. Thus, compared with a case where the bar part is positioned at the outer region of the casing 20, it is effectively prevent the magnet screen 50 from being pulled out in the direction opposite to the direction of the installation surface 40. Therefore, an intrusion of air between the magnet screen 50 and the installation surface 40 can be effectively prevented. Furthermore, as compared with the case where the bar part 60 is positioned at the outer region of the casing 20, it is possible to avoid an increase in a size of the magnet screen device 100.

It is preferable that the magnet screen 50 is positioned between the installation surface 40 and the bar part 60 in a cross-sectional view (see FIG. 1).

According to this configuration, the installation surface is positioned on one of sides of the magnet screen 50 and the bar part 60 is positioned on other of the sides of the magnet screen 50 based on the magnet screen 50 in a cross-sectional view. Namely, the magnet screen 50 is positioned to be sandwiched between the installation surface 40 and the bar part 60 in a cross-sectional view. Thus, it is possible to suitably prevent the movement of the magnet screen 50 in the direction opposite to the direction of the installation surface 40.

Furthermore, it is preferable that wherein the bar part 60 at the region where the opening 10 is provided, is rotatable due to a sliding contact of the bar part 60 with the magnet screen 50 (see FIG. 1).

Specifically, both ends of the bar part 60 are connected to both side portions of the casing 20 to be rotatable in a clockwise or counterclockwise direction in a cross-sectional view. To adopt such the configuration, it is preferable that the bar part 60 has a hollow portion in the bar part, the hollow portion extending in a longitudinal direction. In a case that the bar part 60 has the hollow portion in the bar part, the hollow portion functions as a space for inserting a protrusion secured to the casing 20.

As a result, the bar part 60 becomes rotatable due to the sliding contact of the bar part 60 with the magnet screen 50. As described above, the bar part 60 can prevent the movement of the magnet screen 50 in the direction opposite to the direction of the installation surface, whereas a frictional resistance between the magnet screen 50 and the bar part 60 may make a smooth pull out of the magnet screen 50 difficult. In light of the above matters, in a case that the bar part 60 is rotatable in the clockwise or counterclockwise direction in the cross-sectional view, the frictional resistance is reduced, which makes the smooth pull out of the magnet screen 50 possible.

The present invention preferably adopts the following embodiments.

Figure 2:
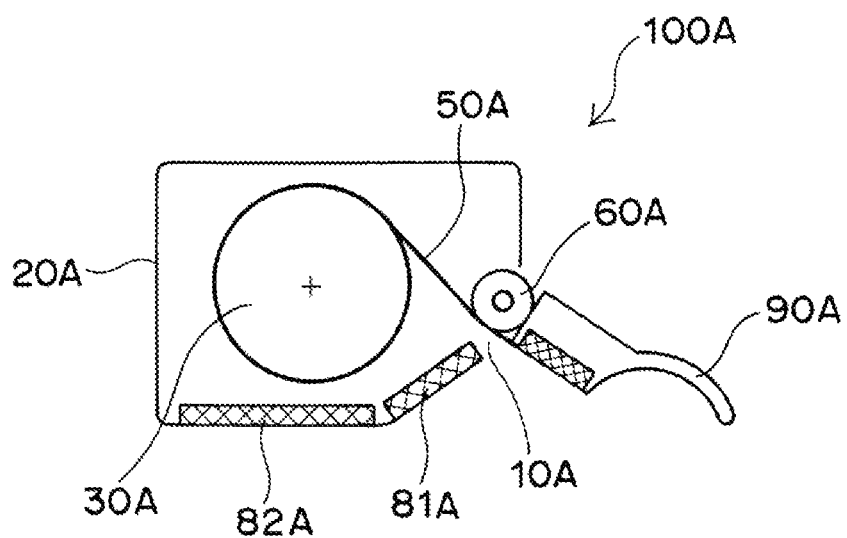
FIG. 2 is a cross-sectional view schematically showing a magnet screen device including a first magnet and a second magnet.

In an embodiment, it is preferable that a casing 20A comprises a first magnet 81A on a surface of the casing and a second magnet 82A extending to a direction different from an extension direction of the first magnet 81A in a cross-sectional view, and a bar part 60A is positioned to be substantially flush with the first magnet 81A in a cross-sectional view (see FIG. 2).

In this embodiment, the casing 20A includes the first magnet 81A on the surface thereof and the second magnet 82A extending in the direction different from the extension direction of the first magnet 81A, as shown in FIG. 2. That is, in this embodiment, two magnets are provided on the surface of the casing 20A, and the two magnets mutually extend in different directions in a cross-sectional view. By adopting such the configuration, an orientation of the casing 20A can be changed in cross-sectional view between a case that the first magnet 81A is attached to the installation surface and a case that the second magnet 82A is attached to the installation surface.

As described above, in this embodiment, the bar part 60A is positioned to be substantially flush with the first magnet 81A in the cross-sectional view. According to such the configuration, in a state where the first magnet 81A is attached to the installation surface, due to a substantial same plane arrangement of the first magnet 81A and the bar part 60A, the bar part 60A can be positioned on the installation surface such that the magnet screen 50A at the opening 10A is sandwiched in a cross-sectional view. Thus, the bar part 60A makes it possible to press the magnet screen 50A on the installation surface.

On the other hand, in a state that the second magnet 82 A is attached to the installation surface and/or in a state that both of the first magnet 81A and the second magnet 82A are spaced apart from the installation surface, due to the first magnet 81A which extends in the direction different from the extension direction of the second magnet 82A, the first magnet 81A is positioned to be spaced apart from the installation surface. In a case that the first magnet 81A is spaced apart from the installation surface, due to a substantial same plane arrangement of the first magnet 81A and the bar part 60A, the bar part 60A can be positioned to be spaced apart from the installation surface in a cross-sectional view.

Hereinafter, description will be performed on a basis of the magnetic screen device including the first magnet and the second magnet each of which mutually extends in a different direction on the surface of the casing in a cross-sectional view.

Figure 3A:
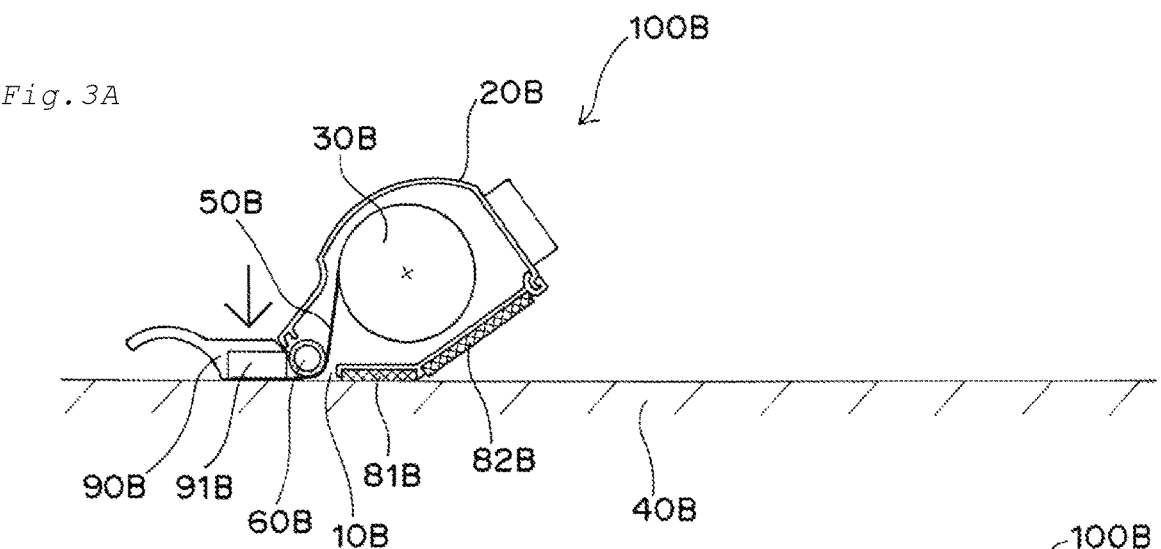
FIGS. 3A-3C are cross-sectional views schematically showing an embodiment on a use of a magnet screen device.
Figure 3B:
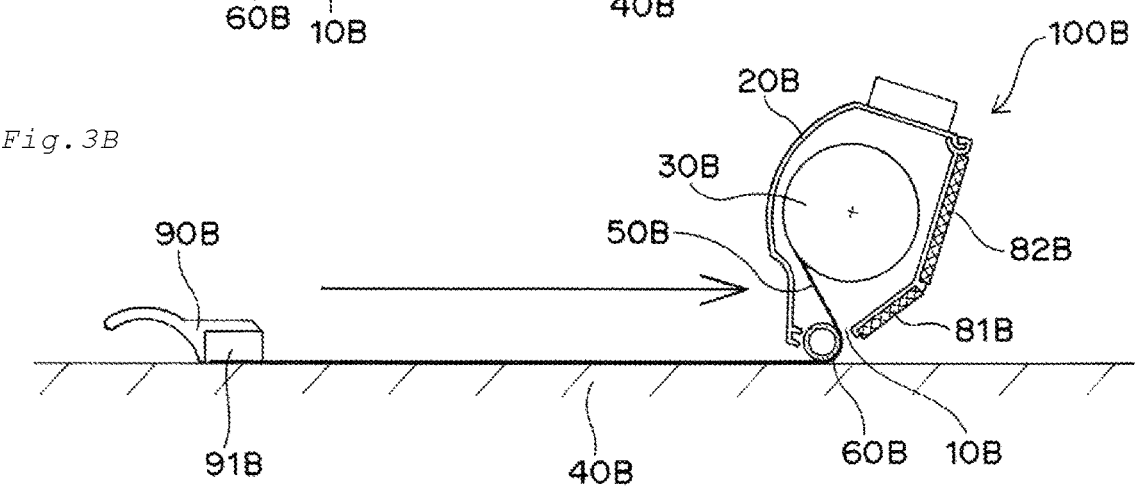
Figure 3C:
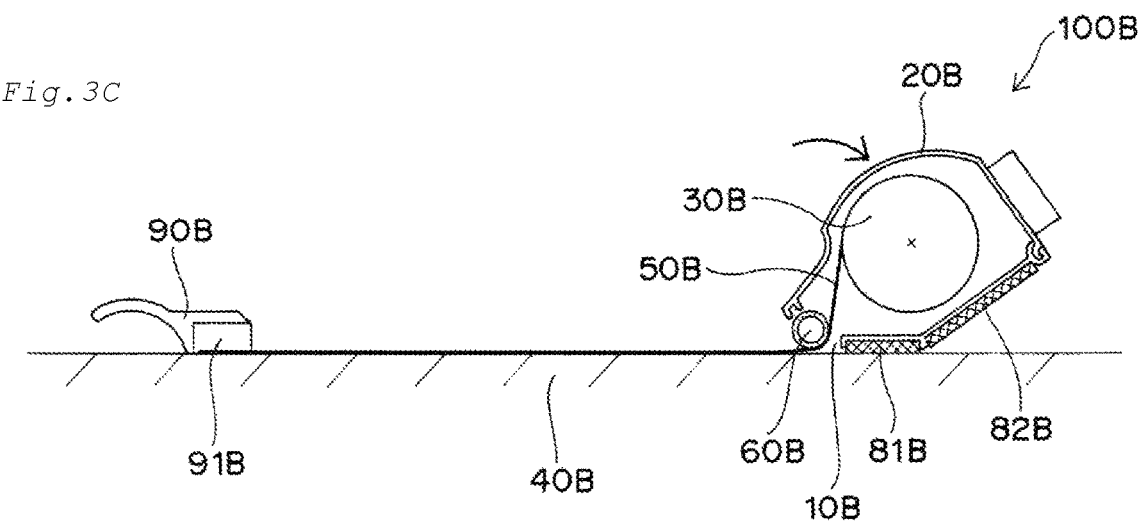

One of use embodiments of the magnetic screen device according to an embodiment of the present invention is an embodiment wherein a casing 20B is moved in a state where an end bar 90B provided at an end portion of a magnet screen 50B is attached to an installation surface 40B (See FIGS. 3A to 3C).

Specifically, as shown in FIG. 3A, the end bar 90B provided at the end portion of the magnet screen 50B and also the first magnet 81B provided on the surface of the casing 20B are attached to a predetermined position of the installation surface 40B. Namely, in an embodiment of FIG. 3A, the casing 20B is in a stationary state.

Subsequently, as shown in FIG. 3B, in a state that the end bar 90B is attached to the installation surface 40B and also the first magnet 81B as well as a second magnet 82B are spaced apart from the installation surface 40B, the casing 20B is moved in a direction along the installation surface 40B. Specifically, in this state, the casing 20B is moved in a direction along the installation surface 40B such that the installation surface 40B and an opening 10B of the casing 20B are opposed to each other. Namely, in the embodiment of FIG. 3B, the casing 20B is in a moving state in a direction.

In a case that the casing 20B is moved in a direction along the installation surface 40B such that the installation surface 40B and the opening 10B of the casing 20B are opposed to each other, due to an attachment of the end bar 90B on the installation surface 40B, the magnet screen 50B wound on the roll 30 is pulled out from the opening 10B of the casing 20B and is attached to the installation surface 40B. In the present invention, a bar part 60B is positioned at a region where the opening 10B of the casing 20B is provided. Thus, in a case that the casing 20B is moved along the installation surface 40B such that the installation surface 40B and the opening 10B of the casing 20B are opposed to each other, the bar part 60B is located directly above the magnet screen 50B at the opening 10B in a cross-sectional view and also the installation surface 40B is located directly below the magnet screen 50B.

Specifically, in this embodiment, the casing 20B is moved in a direction along the installation surface 40B such that the installation surface 40B and the opening 10B of the casing 20B are opposed to each other. Thus, "during a direction-movement of the casing 20B", a self-weight of the bar part 60B is "continuously" applied to the magnet screen 50B. Upon a "continuously" application of the self-weight of the bar part 60B to the magnet screen 50B, the self-weight is also "continuously" applied to the installation surface located directly below the magnet screen 50B "during a direction-movement of the casing 20 B". Thus, due to the self-weight which can be continuously applied, the bar part 60B "continuously" contacts the magnet screen 50B directly below the bar part 60B "during a direction-movement of the casing 20B" and subsequently the magnet screen 50B which has "continuously" contacted the bar part 60B can "continuously" contact the installation surface 40B located directly below the magnet screen 50B "during a direction-movement of the casing 20B". Namely, the bar part 60B enables the magnet screen 50B directly below the bar part 60B to be "continuously" pressed toward the installation surface 40B "during a direction-movement of the casing 20B". As a result, it is possible to "continuously" avoid an occurrence of a "non-contact portion", i.e., gap between the magnet screen 50B and the installation surface 40B "during a direction-movement of the casing 20B". Therefore, the magnet screen 50B can be more suitably attached to the installation surface 40B.

Finally, as shown in FIG. 3C, after moving the casing 20 B by a predetermined length in a direction, the casing 20 B is rotated in a clockwise or counterclockwise direction in a cross-sectional view. Due to this rotational movement, the first magnet 81B can be attached to a predetermined portion of the installation surface 40B. By an attachment of the first magnet 81B to the installation surface 40B, a magnetic force of the first magnet 81B enables the casing 20B to be secured. In this embodiment, it is not limited to an embodiment wherein the self weight of the bar part is utilized. It is more preferable that, upon a completion of the pull out of the magnet screen by a direction-movement of the casing 20B, the casing 20B is rotated in a counterclockwise direction opposite to an arrow direction shown in FIG. 3C (i.e., clockwise direction), to thereby press the bar part 60B in a direction substantially perpendicular to the installation surface 40B. Therefore, it is possible to more suitably prevent the pulled out-magnet screen from being spaced apart at an end portion of the pulled out-magnet screen.

Next, another use embodiment of the magnet screen device according to an embodiment of the present invention is an embodiment wherein an end bar 90C provided at the end portion of the magnet screen 50C is moved in a direction in a state that a casing 20C is attached to an installation surface 40C (See FIGS. 4A to 4D).

Specifically, as shown in FIG. 4A, a second magnet 82C provided on a surface of the casing 20C is attached to a predetermined portion of the installation surface 40 C. That is, in the embodiment of FIG. 4A, the casing 20 C is in a secure state.

After the casing 20C was subjected to the secure state, as shown in FIG. 4B, the end bar 90C around an opening 10C of the casing 20C is moved in the substantially same direction as an extension direction of the installation surface 40C, and the magnetic screen 50C is pulled out through the opening 10C.

After a pull out of the magnet screen 50C, as shown in FIG. 4C, the end bar 90C provided at an end portion of the magnet screen 50C is attached to the installation surface 40C through a magnetic surface 91C positioned at the end bar 90C.

After an attachment of the end bar 90C to the installation surface 40C, as shown in FIG. 4D, the casing 20C is rotated in a clockwise direction in a cross-sectional view. Specifically, the casing 20C is rotated in the clockwise direction in the cross-sectional view such that a first magnet 81C can be attached to the installation surface 400. A rotational movement of the casing 20C enables the first magnet 81C to be attached to the installation surface 40C.

As described above, in the present invention, the bar part 60C at the opening 100 of the casing 20C is positioned to be substantially flush with the first magnet 81C in a cross-sectional view. According to such the configuration, upon an attachment of the first magnet 81 C to the installation surface, due to a substantial same plane arrangement of the first magnet 81C and the bar part 60C, the bar part 60C can be positioned on the installation surface 40C such that the magnet screen 500 at the opening 100 is sandwiched in a cross-sectional view.

Specifically, as shown in FIG. 4D, upon an attachment of the first magnet 81 C to the installation surface, due to a substantial same plane arrangement of the first magnet 81C and the bar part 60C, the bar part 60C is located directly above the magnet screen 50C at the opening 100, and the installation surface 40C is located directly below the magnet screen 500 in a cross-sectional view.

Such the arrangement of the bar part 60C may cause a self-weight of the bar part 60C to be applied to the magnet screen 50C at a pull out portion from the opening 100 of the casing 20C. Due to an application of the self-weight of the bar part 60C to the magnet screen 50C, the self-weight is also applied to the installation surface 40C directly below the magnet screen 50C. Thus, due to the self-weight, the bar part 60C can suitably contact the magnet screen 50C directly below the bar part 600, and the magnet screen 50C suitably contacted with the bar part 60C can contact the installation surface 40C directly below the magnet screen 50C. Namely, the bar part 60C enables the magnet screen 50C directly below the bar part 60C to be suitably pressed toward the installation surface 40C. As a result, it is possible to suitably avoid an occurrence of a "non-contact portion", i.e., gap between the magnet screen 50C and the installation surface 40C. Therefore, the magnet screen 50C can be suitably attached to the installation surface 40C. In this embodiment, it is not limited to an embodiment wherein the self weight of the bar part is utilized. It is more preferable that, upon a completion of the pull out of the magnet screen, the casing 20C is rotated in an arrow direction shown in FIG. 4D (i.e., clockwise direction), to thereby press the bar part 60C in a direction substantially perpendicular to the installation surface 40C. Therefore, it is possible to more suitably prevent the magnet screen from being spaced apart at an end portion of the magnet screen at a start point of the pull out.

Figure 5:
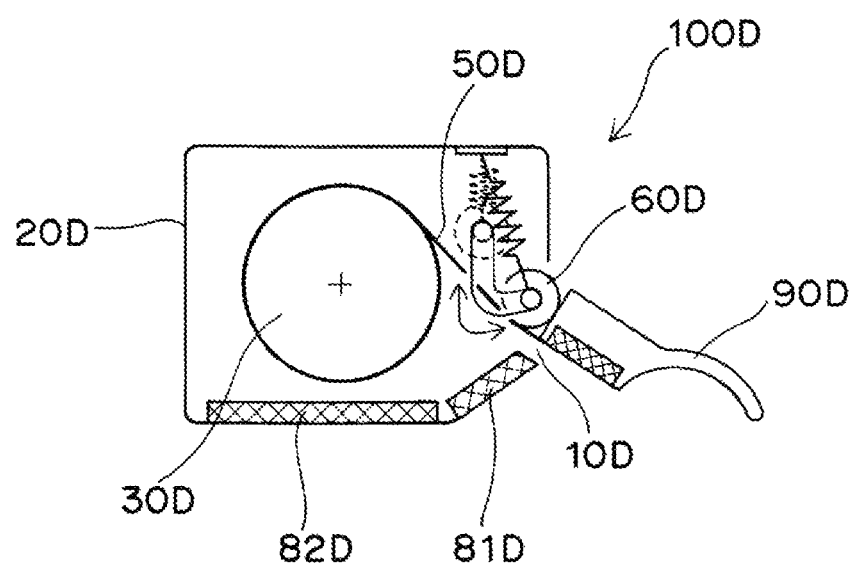
FIG. 5 is a cross-sectional view schematically showing a magnet screen device including a bar part which is capable of protruding.

In an embodiment, it is preferable that a bar part 60D is configured to be capable of protruding at a region where an opening 10D is provided (see FIG. 5).

According to such a configuration, as shown in FIG. 5, upon a pull out of a magnet screen 50D and an attachment of the magnet screen 50D to an installation surface such as a blackboard or the like, the bar part 60D enables the magnet screen 50D at a pull out portion of an opening 10D to be suitably pressed toward the installation surface. Thus, the bar part 60D can more effectively prevent a movement of the magnet screen 50D in a direction opposite to a direction of the installation surface side. Thus, it is possible to more effectively prevent an intrusion of air between the magnet screen 50D and the installation surface. Therefore, a so-called "gap" between the magnet screen 50D and the installation surface can be more suitably prevented. As a result, the magnet screen 50D can be more suitably attached to the installation surface.

Figure 6:
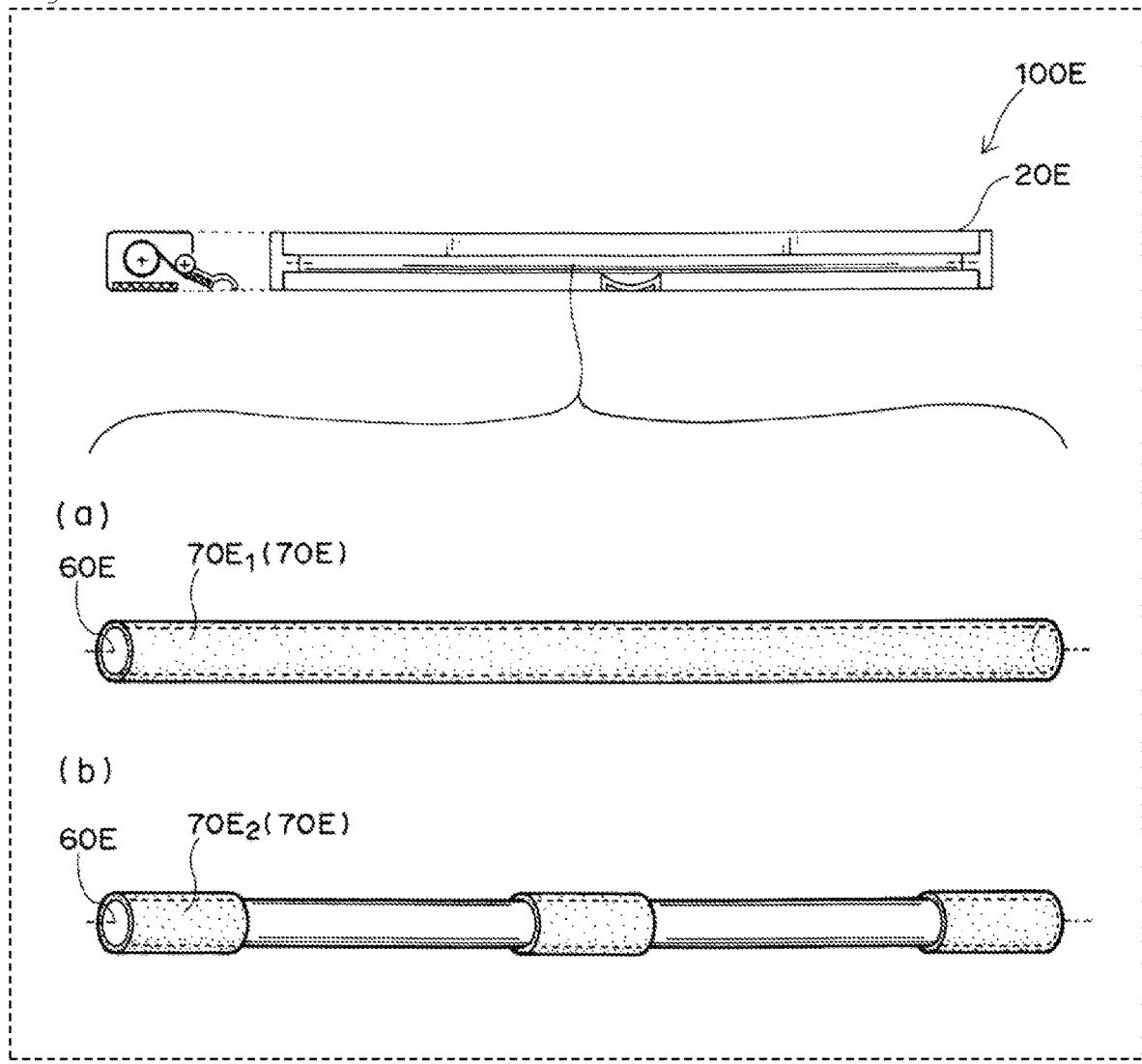
FIG. 6 is a schematical view showing a magnet screen device including a bar part with its surface on which a press part is provided.

In an embodiment, it is preferable that a bar part 60E includes a press part 70E on at least a portion of a surface of the bar part 60E, and the press part 70E is configured to be capable of contacting a magnet screen (see FIG. 6).

There is a case that it is not easy to pull out or wind the magnet screen in a vertical direction or a horizontal direction upon a pull out or a winding of the magnet screen. Specifically, a height of the magnet screen in a pull out direction or winding direction does not become equal as a whole, and thus the magnet screen may be pulled out in an oblique direction and may be wound, which means that a so-called "bamboo shoot phenomenon" may occur. In particular, an occurrence of the "bamboo shoot phenomenon" may cause a difference between a height of one of ends of the magnet screen and that of other of ends of the magnet screen in the pull out or winding direction of the magnet screen. The difference of the height may make a suitable projection of the image from the projector onto the magnet screen difficult.

In light of the above matters, as shown in FIG. 6, it is preferable that the bar part 60E includes the press part 70E located on at least a portion of the surface of the bar part 60E, the press part 70E being configured to be capable of contacting the magnet screen. In an embodiment, a press part $0E_1$ may be located on an entire surface of the bar part 60E as shown in FIG. 6A. In another embodiment, a press part $70E_2$ may be located on an end portion and an intermediate portion of a surface of the bar part 60E as shown in FIG. 6B. According to this configuration, a thickness of a portion of the bar part 60E with the press part 70E on the bar part 60E can be made larger than a thickness of another portion of the bar part 60E with no press part 70E on the bar part 60E. Therefore, it is possible to more suitably press at least a part of the magnet screen which is opposed to a portion where the press part 70E is located, as compared with another portion where no press part 70E is located. Thus, upon a pull out or winding of the magnet screen, the press part enables at least a part of the magnet screen to be pressed toward an installation surface side. Particularly, an embodiment shown in FIG. 6A is more preferable since the press part enables a whole main surface of the magnet screen to be pressed toward the installation surface upon a pull out or winding of the magnet screen.

Thus, it is possible to prevent a start of the pull out of the magnet screen in a state that the magnet screen is oriented in an oblique direction and to also prevent a start of the winding of the magnet screen in a state that the magnet screen is oriented in the oblique direction. As a result, the magnet screen can be pulled out and wound in a vertical direction or a horizontal direction. Therefore, an image from a projector can suitably be projected on the magnet screen. In view of an improvement of an adhesion between the magnet screen and the press part 70E, it is preferable that the press part 70E is made of a resin material having elastic characteristics such as a rubber material.

Although some embodiments of the present invention have been hereinbefore described, these are merely typical examples in the present invention. It will be readily appreciated by the skilled person that various modifications are possible without departing from the scope of the present invention.

INDUSTRIAL APPLICABILITY

The magnet screen device according to an embodiment of the present invention can be used together with an ultrashort focus projector.

CROSS REFERENCE TO RELATED PATENT APPLICATION

The present application claims the right of priority of Japanese Patent Application No. 2016-177003 (filed on Sep. 9, 2016, the title of the invention: "MAGNET SCREEN DEVICE"), the disclosure of which is incorporated herein by reference.

EXPLANATION OF REFERENCE NUMERALS

100, 100A, 100B, 100C, 100D, 100E Magnet screen device
10, 10A, 10B, 100, 10D Opening
20, 20A, 20B, 20C, 20D, 20E Casing
30, 30A, 30B, 30C, 30D Roll
40, 40B, 40C Installation surface
50, 50A, 50B, 50C, 50D Magnet screen
60, 60A, 60B, 60C, 60D, 60E Bar part
70E, 70E$_1$, 70E$_2$ Press part
80 Magnet
81A, 81B, 81C, 81D First magnet
82A, 82B, 82C, 82D Second magnet
90, 90 A, 90 B, 90 C, 90 D End bar
91, 91B, 91C Magnetic surface

The invention claimed is:

1. A magnet screen device, comprising
a casing having an opening, a roll rotatably placed in the casing, and a magnet screen, the magnet screen being configured to be wound on the roll during a storage of the magnet screen and configured to be pulled out from the opening of the casing and to be attached to an installation surface upon use of the magnet screen,
wherein the magnet screen device further comprises a bar part at a region where the opening is provided,
wherein the bar part is configured to be capable of contacting the magnet screen at the region where the opening is provided,
wherein the bar part is configured such that both ends of the bar part are connected to the casing, and
wherein a portion of the bar part is provided inside the casing.

2. The magnet screen device according to claim 1, wherein the magnet screen at the opening is positioned between the bar part and the installation surface in a cross-sectional view.

3. The magnet screen device according to claim 1, wherein the bar part is configured to be rotatable due to a sliding contact of the bar part with the magnet screen.

4. The magnet screen device according to claim 1, wherein the casing comprises a first magnet on a surface of the casing and a second magnet extending to a direction different from an extension direction of the first magnet in a cross-sectional view, and
wherein the bar part is positioned to be flush with the first magnet in the cross-sectional view.

5. The magnet screen device according to claim 4, wherein the magnet screen is configured to be capable of being pulled out in a direction in a state that the second magnet is attached to the installation surface, and
wherein a rotational movement in a clockwise direction or a counterclockwise direction of the casing enables the bar part which is flush with the first magnet to be moved to a side of the installation surface in a cross-sectional view, the rotational movement in the clockwise direction or the counterclockwise direction of the casing being configured such that the first magnet is attached to the installation surface in the cross-sectional view.

6. The magnet screen device according to claim 5, wherein the bar part is configured such that a self-weight of the bar part is applied to the magnet screen at a pull out portion from the opening upon the rotational movement of the casing.

7. The magnet screen device according to claim 1, wherein the magnet screen device comprises an end bar having a magnet surface, the end bar being positioned at other of end portions which is opposite to one of end portions contacted with the roll,
wherein the casing comprises a first magnet on a surface of the casing and a second magnet extending to a direction different from an extension direction of the first magnet in a cross-sectional view, and
wherein the casing is configured to be capable of moving in a direction along the installation surface in a state that the first magnet and the second magnet are spaced apart from the installation surface and the magnet surface of the end bar is attached to the installation surface.

8. The magnet screen device according to claim 7, wherein the bar part is configured such that a self-weight of the bar part is continuously applied to the magnet screen at a pull out portion from the opening during a movement in a direction of the casing.

9. The magnet screen device according to claim 7, wherein a rotational movement in a clockwise direction or a counterclockwise direction of the casing moved in a direction enables the first magnet to be attached to the installation surface in a cross-sectional view.

10. The magnet screen device according to claim 1, wherein the bar part is configured to be capable of protruding at the region where the opening is provided.

11. The magnet screen device according to claim 1, wherein the bar part comprises a press part on at least a portion of a surface of the bar part, and
wherein the press part is configured to be capable of contacting the magnet screen.

12. The magnet screen device according to claim 1, wherein the bar part is provided in a fixed position relative to the casing.

13. The magnet screen device according to claim 12, wherein the bar part is configured to be rotatable in the fixed position.

14. A magnet screen device, comprising
a casing having an opening, a roll rotatably placed in the casing, and a magnet screen, the magnet screen being configured to be wound on the roll during a storage of the magnet screen and configured to be pulled out from the opening of the casing and to be attached to an installation surface upon use of the magnet screen,
wherein the magnet screen device further comprises a bar part at a region where the opening is provided,
wherein the bar part is configured to be capable of contacting the magnet screen at the region where the opening is provided,
wherein the bar part is configured such that both ends of the bar part are connected to the casing, and
wherein an axis of the bar part is partially internal to the casing.

* * * * *